United States Patent [19]
Kitaoka

[11] Patent Number: 5,479,234
[45] Date of Patent: Dec. 26, 1995

[54] AUTOMATIC FOCUS SYSTEM

[75] Inventor: Naoki Kitaoka, Sakura, Japan

[73] Assignee: Nikon Corporation, Tokyo, Japan

[21] Appl. No.: 209,737

[22] Filed: Mar. 14, 1994

[30] Foreign Application Priority Data

May 28, 1993 [JP] Japan ..................... 5-151024

[51] Int. Cl.⁶ .................................. G03B 13/36
[52] U.S. Cl. ............................................ 354/402
[58] Field of Search .................... 354/400, 402; 348/352

[56] References Cited

U.S. PATENT DOCUMENTS

| | | | |
|---|---|---|---|
| 4,531,158 | 7/1985 | Murakami et al. | 348/352 |
| 4,639,588 | 1/1987 | Shinoda | 354/403 X |
| 4,980,715 | 12/1990 | Utagawa | 354/402 |

FOREIGN PATENT DOCUMENTS

| | | |
|---|---|---|
| 60-53913 | 3/1985 | Japan . |
| 63-148218 | 6/1988 | Japan . |

*Primary Examiner*—W. B. Perkey
*Attorney, Agent, or Firm*—Oliff & Berridge

[57] ABSTRACT

The invention provides an automatic focus system which can pursue a subject beyond established limits when the subject is moving. This invention is an automatic focus system equipped with a drive mechanism which automatically drives the focus adjustment lens and which contains a control mechanism which controls the drive range of the drive mechanism, a movement determination mechanism which determines whether the subject is moving, and a control release mechanism which releases the control of the control mechanism when it is determined by the movement determination mechanism that the subject is moving.

26 Claims, 6 Drawing Sheets

AUTOMATIC FOCUS SYSTEM

BACKGROUND OF THE INVENTION

1. Field of the Invention

This invention relates to an automatic focus system most suitable for cameras.

2. Description of Related Art

In cameras with automatic focus systems, the camera drives the lens and performs the operations of focussing on the primary subject when the photographer points the lens at the primary subject and depresses the release button halfway so that the camera is in a range measurement state. However, if the photographer accidentally places the primary subject outside the field of vision of range measurement, the camera again drives the lens and focuses instead on whatever non-primary subject the photographer has accidentally placed within the field of vision of range measurement.

When the primary subject and non-primary subjects are adjacent to one another, it is conceivable that the action of the camera focussing on the non-primary subject can be completed in a relatively short time and the photographer can easily return the focus state of the camera to focussing on the primary subject. However, when the non-primary subject is far from the primary subject, a longer time is required for the photographer to return the primary subject to the camera's field of vision for range measurement and to return the camera once again to a state wherein it is focussed on the primary subject, thereby missing photographic opportunities.

Among the conventional technologies designed to solve such problems, there are systems which have close-range limits and far-range limits for the lens and which have a limit for driving the lens to far ranges or to short ranges above a certain level; systems which have software which prevents the camera from refocussing as long as the photographer does not repeat the range measurement operation when the camera has once accomplished focus recognition; and systems such as set forth in Japanese Patent Disclosure Sho 60-53913 which allow the photographer to arbitrarily set the range for the focus operation performed by the camera.

However, because with these conventional technologies the camera's focus operation is controlled or prevented without regard to the nature of the subject, the problem arises that it impossible to chase a subject beyond an established limit if the subject is moving.

SUMMARY OF THE INVENTION

The objective of the invention is to overcome these problems, and to provide an automatic focus system which can chase a subject beyond the established limit when the subject is moving.

In order to accomplish this objective, the automatic focus system of this invention comprises an automatic focus system equipped with a drive mechanism which automatically drives the focus adjustment lens and which contains a control mechanism which controls the drive range of the drive mechanism, a movement determination mechanism which determines whether the subject is moving, and a control release mechanism which releases the control of the control mechanism when it is determined by the movement determination mechanism that the subject is moving.

In an automatic focus system comprised of the described structure, it is possible to release the control of the control mechanism and drive the lens beyond the established limits of the range of the lens when it is determined by the movement determination mechanism that the subject is moving.

BRIEF DESCRIPTION OF THE DRAWINGS

The invention will be described with reference to the drawings, in which.

DETAILED DESCRIPTION OF PREFERRED EMBODIMENTS

Figure 1:
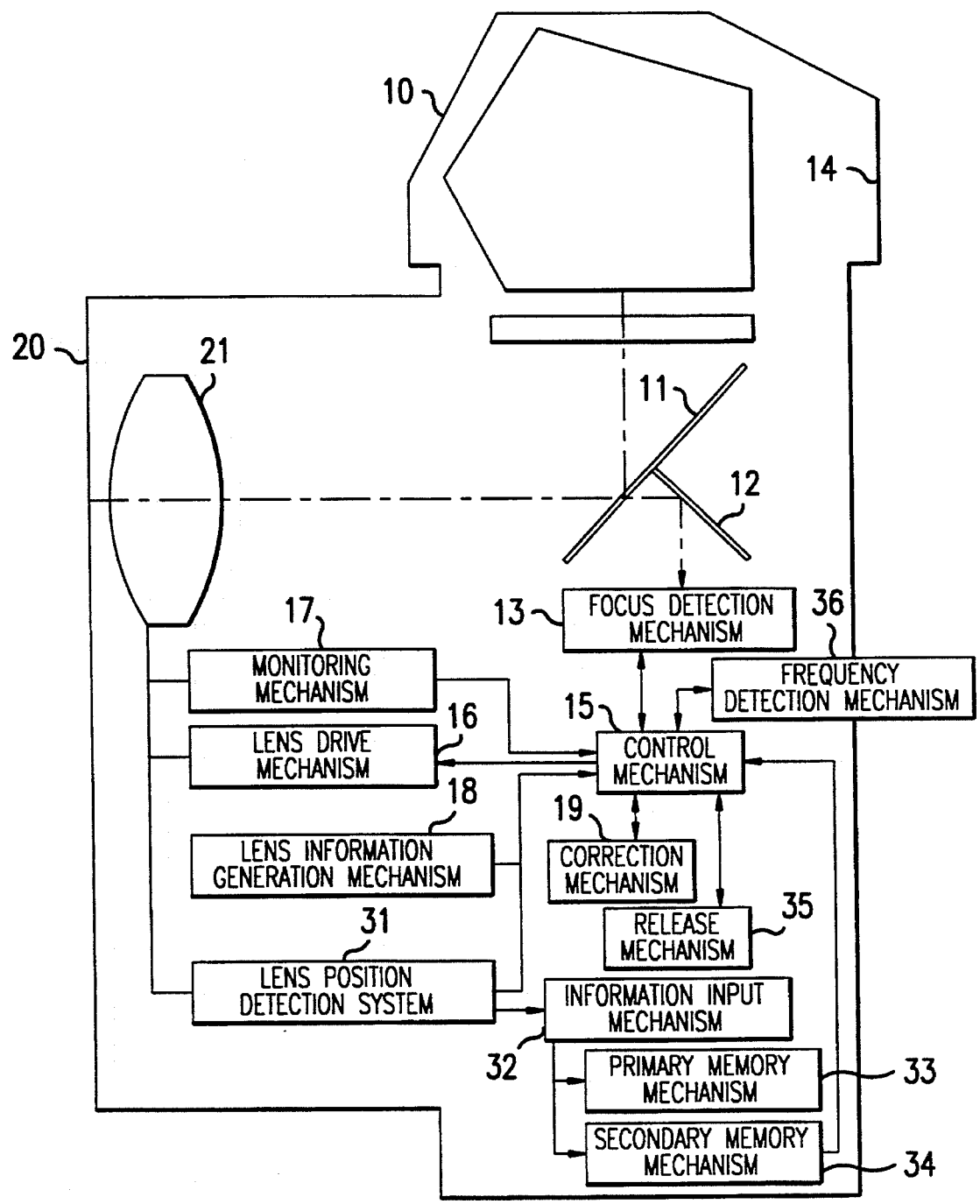
FIG. 1 is a block and line drawing showing an embodiment of the automatic focus system according to the this invention.

FIG. 1 is a block and line drawing which shows an embodiment of the automatic focus system used by the invention.

In FIG. 1, an interchangeable lens 20 is mounted in the camera 10 so as to be easily mounted or removed. When the camera is in the state in which the photographic lens 20 is mounted, light from the subject passes through the focussing lens 21, is partially reflected by the main mirror 11 and is guided to the view finder 14. Some of the incidental light passing through the main mirror 11, is reflected by the sub-mirror 12, and is guided, as light used in focus detection, to the focus detection mechanism 13. The focus detection mechanism 13 is a common focus detection mechanism composed of a focus detection optical system, an electric charge accumulation-type image sensor, a focus detection calculator, and an image sensor drive controller. In other words, after charge accumulation has been completed in the image sensor, the amount of defocus is intermittently computed by the focus detection calculator. This amount of defocus is an amount corresponding to the distance of the conjugal film surface which comprises the preset imaging surface and the image surface of the imaging optical system along the optical axis.

The control mechanism 15 receives the data related to the amount of defocus from the focus detection mechanism 13, drives the motor of the lens drive mechanism 16, and moves the focus adjustment lens included in the optical imaging system so that the preset imaging surface and the image surface of the optical imaging surface coincide.

When it is difficult to accurately control the driving of the motor of the lens drive mechanism 16 by the input signal, the control mechanism 15 controls the driving of the focus adjustment lens by using a feedback pulse from a monitoring mechanism 17 which is composed of items such as a photo-interrupter and which detects the amount of movement of the focus adjustment lens. A lens information generation mechanism 18 memorizes a value related to the ratio of the amount of movement of the image surface to the feedback pulse number. The control mechanism 15 reads the value from the lens information generation mechanism 18, calculates a pulse number corresponding to the amount of movement of the image surface needed in order to focus, and drives the focus adjustment lens until the feedback pulse matches the predetermined pulse number.

A lens position detection system 31 detects the absolute distance of the photographic lens 20. The information about the detected absolute distance of the lens 20 is transmitted to the control mechanism 15, the control mechanism 15 recognizing the absolute distance by which the photographic lens is positioned when driving the lens 20. Information from the lens position detection system 31, relative to the absolute distances, is memorized by the primary memory mechanism 33 and the secondary memory mechanism 34 via an information input mechanism 32. The information input mechanism 32 also causes the arbitrary two distances established by the photographer to be memorized by the primary memory mechanism 33 and the secondary memory mechanism 34.

The two pieces of information relating to the absolute distance recorded by the primary memory mechanism 33 and the secondary memory mechanism 34 are transmitted to the control mechanism 15. The control mechanism 15 uses the distance information recorded by the primary memory mechanism 33 and the secondary memory mechanism 34 to establish a permissible lens drive range between the two recorded pieces of distance information, and immediately halts the drive motor when the absolute distance information generated by the lens position detection system 31 when driving the lens 20 deviates from the established permissible lens drive range, thereby preventing the lens 20 from being driven beyond the range established by the primary memory mechanism 33 and the secondary memory mechanism 34.

The correction mechanism 19 is the known correction mechanism described in Japanese Patent Disclosure Sho 63-148218, the disclosure of which is incorporated herein, which receives the output of the monitoring mechanism 17 and the output of the focus detection mechanism 13, and determines whether the subject is moving. If it is determined that the subject is moving, the amount of drive correction required to pursue the subject is computed and the control mechanism 15 drives the lens as required to follow the subject on the basis of the calculation.

When it is determined that the subject is moving and the control mechanism 15 has commenced pursuit drive control of the lens, a signal is output from the release mechanism 35 to the control mechanism 15 to override the control mechanism 15 limitation to the permissible lens drive range, defined as a preventative mechanism, thereby enabling the lens to be driven beyond the permissible lens drive range established earlier by the primary memory mechanism 33 and the secondary memory mechanism 34.

While the control mechanism 15 is executing pursuit drive control of the lens beyond the permissible lens drive range established earlier through the signal from the release mechanism 35, the output of the permissible lens drive range restriction release signal is continued, even if the subject stops in the focused state. Subsequently, the output of the permissible lens drive range restriction release signal is continued until the lens is driven to the point where the lens position is again within the previously established lens drive range.

The frequency detection mechanism 36 detects the number of times that one of the two absolute distances established by the permissible lens drive range is passed or crossed. The frequency detection mechanism 36 functions as a determination mechanism which determines that the lens is outside the permissible lens drive range if the number of occurrences is odd and is within the permissible lens drive range if the number of occurrences is even (ref. step S16 in FIG. 5 and step S36 in FIG. 6).

Figure 2:
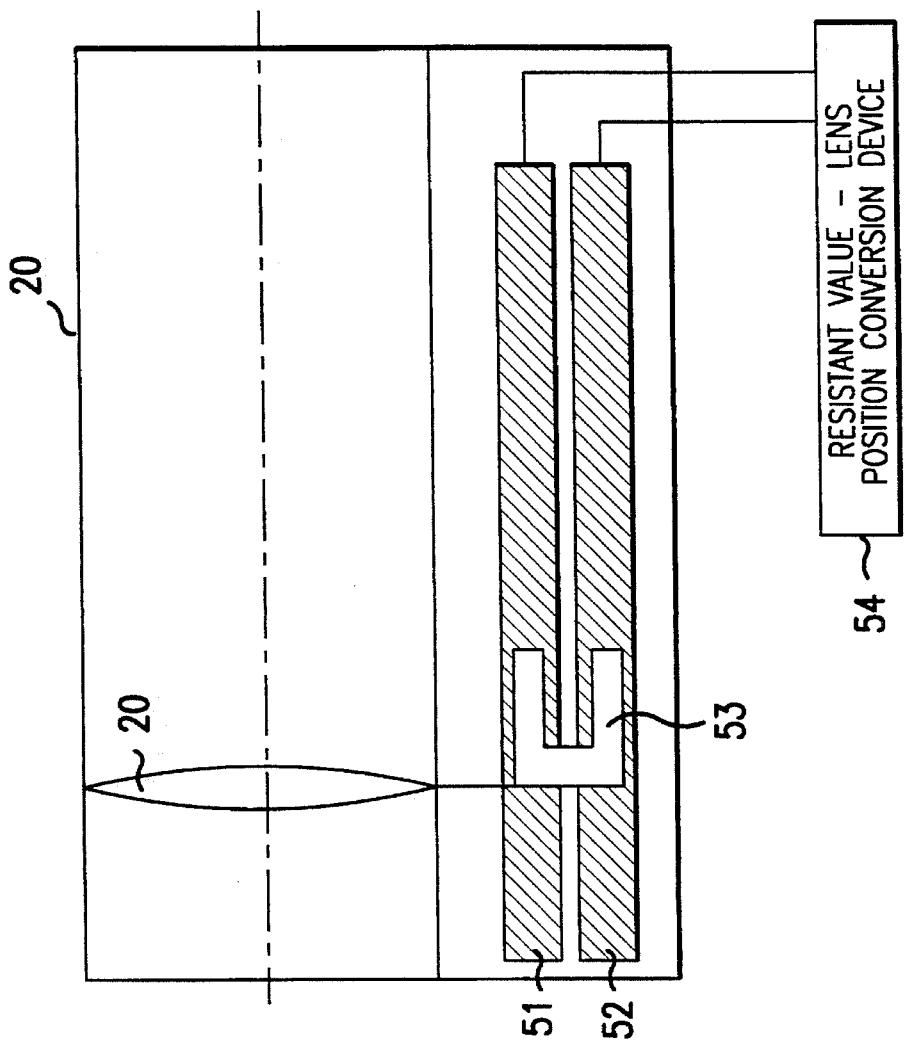
FIG. 2 is a summary drawing showing an embodiment of an automatic focus system according to the invention.

FIG. 2 is a summary drawing showing an example of a lens position detection system 31.

In FIG. 2, at least one of the focussing lenses 21 in the photographic lens 20 has a brush 53 which straddles two resistors 51,52 and moves in accompaniment with the movement of the at least one lens 21 in focussing. The right edge (as viewed in FIG. 2) of the resistors 51,52 is connected to a resistance value-lens position conversion system 54. The resistance value determined by the resistors 51,52 and the brush 53 is converted into an absolute lens position by the resistance value-lens position conversion system 54.

Figure 3:
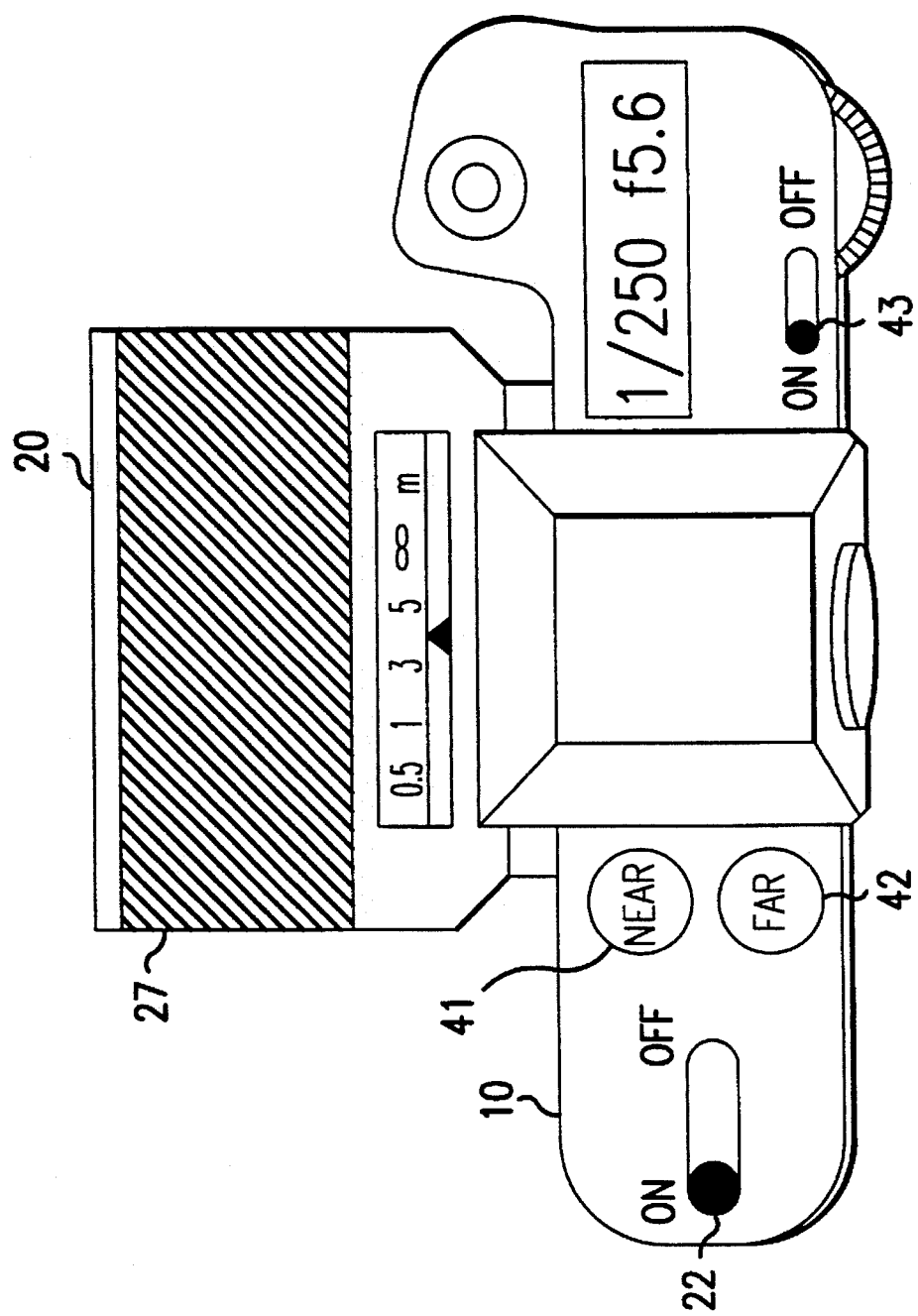
FIG. 3 is an overhead view showing an embodiment of an automatic focus system according to the invention.

FIG. 3 is an overhead view showing an embodiment of the automatic focus system according to the present invention.

FIG. 3 explains the operation which establishes the photographic distance range. The process whereby the photographer sets the photographic distance range consists of first switching the control distance setting switch 22 to the ON position in order to set the upper and lower limits of the photographic distance range. Next, the photographer moves the lens distance band 27 to the closest distance among the positions in which the subject is expected to be and then depresses the close, or near, distance photographic limit setting button 41, thereby recording the close distance position of the permissible lens drive range in the primary memory mechanism 33 (see FIG. 1).

Next, the photographer moves the lens distance band 27 to the farthest distance among the positions in which the subject is expected to be and then depresses the far distance photographic limit setting button 42, thereby recording the far distance position of the permissible lens drive range in the second memory mechanism 34 (see FIG. 1).

When the above settings have been completed, the photographer completes the operation of setting the photographic distance range by switching the control distance setting switch 22 to OFF. Then, by switching the distance control switch 43 to the ON position, the established limits for the photographic distance range become effective.

Figure 4:
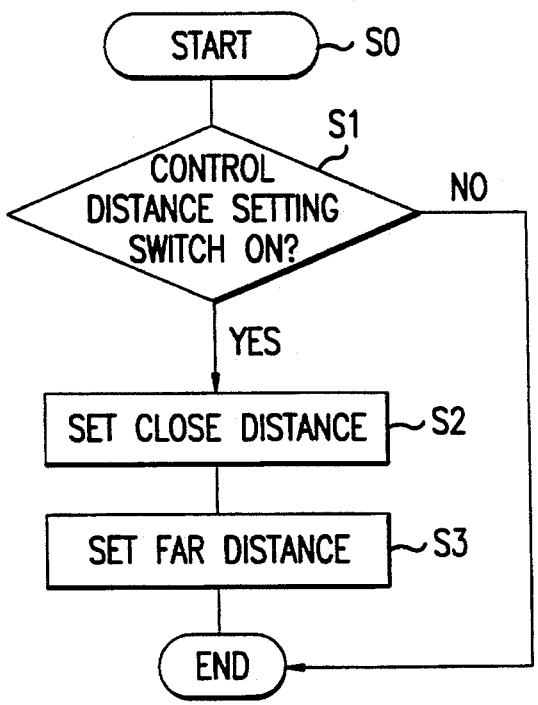
FIG. 4 is a flowchart showing an embodiment of an automatic focus system according to the invention.

FIG. 4 is the flowchart used for setting the permissible range of photographic distances.

The program is started by turning the power source in the camera 10 on (step S0). In step S1, a determination is made whether the control distance setting switch 22 is ON. If not, that is it is OFF, the program moves to the END and is terminated. If the switch is ON, the program moves to step S2. In step S2, the photographer moves the lens distance band 27 to the closest distance among the positions in which he expects the subject to be and depresses the close distance photographic limit setting button 41, thereby recording the close distance position of the permissible lens drive range in the primary memory mechanism 33. In step S3, the photographer moves the lens distance band 27 to the farthest distance among the positions in which he expects the subject to exist and then depresses the far distance photographic limit setting button 42, thereby recording the far distance position of the permissible lens drive range in the second memory mechanism 34. The program is now complete.

Figure 5:
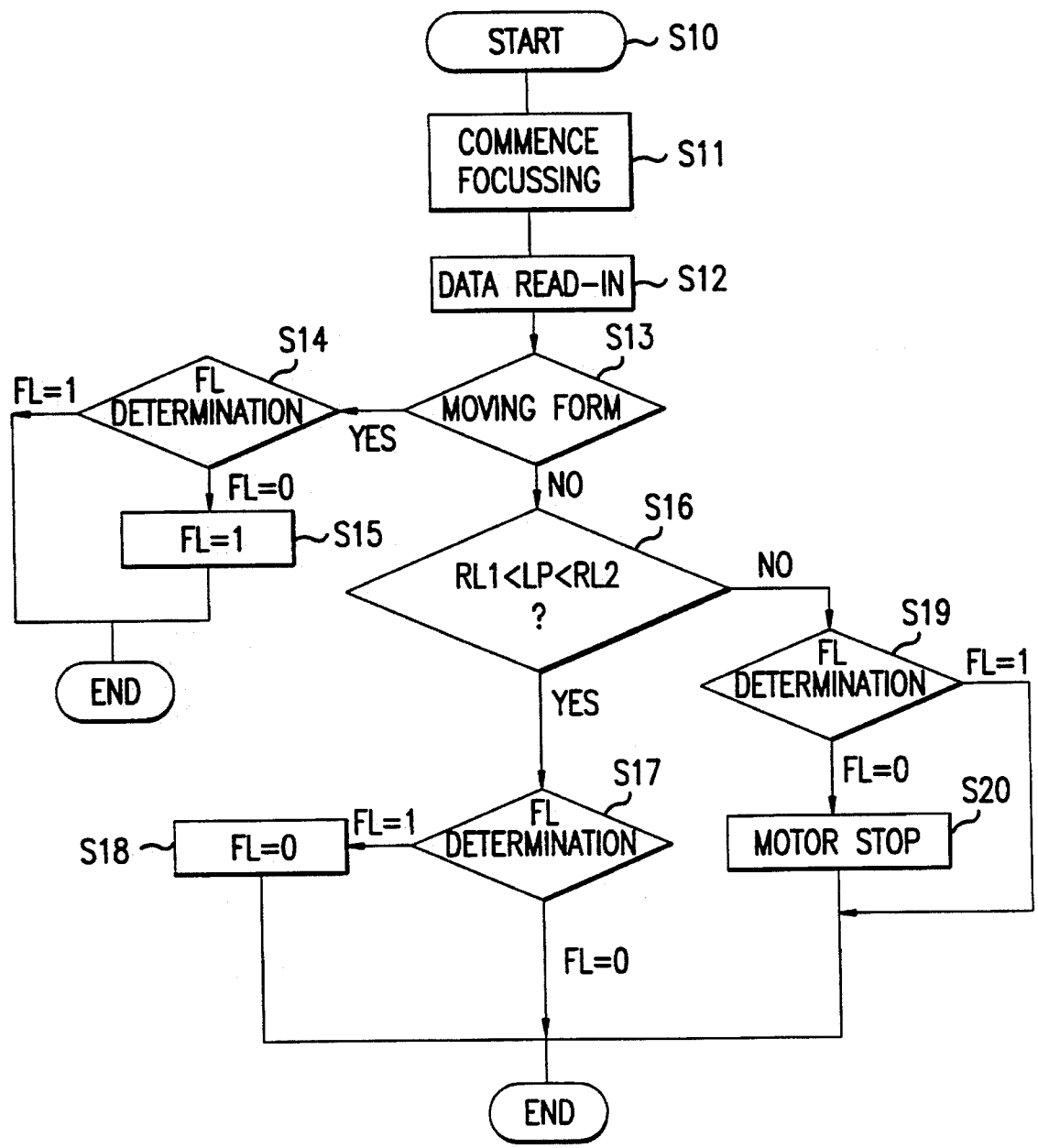
FIG. 5 is a flowchart showing an embodiment of an automatic focus system according to the invention.

FIG. 5 is a flowchart for when the permissible range of photographic distances has been set and the set photographic distance range limit is effective.

In step S10, the program starts when the power source of the camera is turned ON and the release button is depressed halfway. In step S11, the focussing operation is initiated. In this instance, the focussing operation means driving the photographic lens 20 either toward the close position or towards infinity in order to focus the photographic lens 20 on the subject in the distance measurement area, commencing with a focus determination mechanism not shown in the figure. In step S12, the distance data recorded in the primary memory mechanism 33 and the second memory mechanism 34 are read, with the close distance data from the primary memory mechanism 33 being read as the close distance limit RL1 of the permissible lens drive range and the far distance data from the second memory mechanism 34 being read as the far distance limit RL2 of the permissible lens drive range.

In step S13, the determination of whether the subject is moving is made while the focussing operation is performed. If the determination in step S13 is that the subject is moving (YES), the program moves to step S14. If the determination is that the subject is not moving (NO), the program moves to step S16.

In steps S14 and S15, the permissible lens drive range limit release flag (FL) is set to or maintained FL=1. In other words, steps S14 and S15 are executed when it is recognized that the subject is moving, but when the lens drive permissible range limit release flag (FL) is set to FL=1 earlier than the focusing drive operation, the flag (FL) is maintained in step S14 and only when FL=0 is it set to FL=1 in step S15. By placing the flag (FL) in the FL=1 state, the camera continues to pursue a moving subject, and even when the focussing drive has completed its movement outside the temporarily established permissible lens drive range, during the subsequent focussing drive the focussing drive operation is performed without any problems arising from the fact that the lens position is outside the established permissible lens drive range. The state of the flag (FL) is maintained as long as it is not altered, even after subsequent focussing drive operations, and as long as the lens drive range limit is executed.

When the operations in steps S14 and S15 above are completed, the program is terminated.

If the determination in step S13 is that the subject is not moving (NO), in step S16 a determination is made as to whether the current lens position LP is in the range between the close distance limit RL1 of the permissible lens drive range and the far distance limit RL2 of the permissible lens drive range. If the lens position LP is in the range such that RL1<LP<RL2 (YES), the program moves to step S17. If the lens position LP is not in the range such that RL1<LP<RL2 (NO), the program moves to step S19. In this instance, in step S16, it is also possible to utilize the detected number of occurrences from the frequency detection mechanism 36 to have the program move to step S19 if the number of occurrences is odd because the lens is outside the permissible lens drive range, and to have it move to step S17 if the number of occurrences is even because the lens is within the permissible lens drive range.

In step S17, an evaluation is made with regard to the lens drive permissible range limit release flag (FL). In the event that the permissible lens drive limit release flag (FL) is set at FL=1 because the camera has recognized the subject to be moving, and the permissible lens drive range has been set in a focussing operation before the current focussing drive operation, the flag is set to FL=0 and is returned to the regular established condition of the permissible lens drive range. That is, if it is determined in step S17 that the flag is set so that FL=1, the program proceeds to step S18 and the permissible lens drive range limit release flag (FL) is set to FL=0. If it is determined in step S17 that the flag is set to FL=0, the program is terminated.

When the program goes to step S19, there are two possibilities; namely, where (FL=0) when it is impossible to capture the subject during focus driving within the region delineated by RL1<LP<RL2 and where the indication is that the photographic lens 20 has reached either the RL1 or RL2 position at the close distance or at the far distance limits of the permissible lens drive range, respectively and where (FL=1) when the camera continues to pursue the subject outside the established permissible lens drive range control because the subject had been moving during the period of the focussing drive, and the focussing drive is completed outside the permissible lens drive range.

When the state of the flag is such that FL=0, the program moves to step S20, and when the state is FL=1, the program is terminated. In step S20, because it has been determined that it is impossible to capture the subject during focus driving within the range delineated by RL1<LP<RL2, and the indication is that the photographic lens 20 has reached either the RL1 or RL2 position at the close distance limit or the far distance limit of the permissible lens drive range, driving of the lens drive motor is halted, thereby completing the program.

The program shown on the flowchart in FIG. 5 is repeatedly executed as long as the power source of the camera 10 is ON and the release button is depressed halfway.

Figure 7:
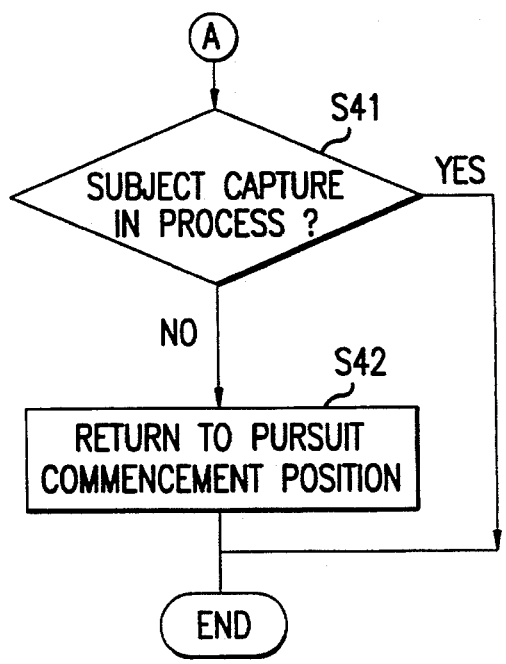
FIG. 7 is a flowchart showing an embodiment of an automatic focus system according to the invention.
Figure 6:
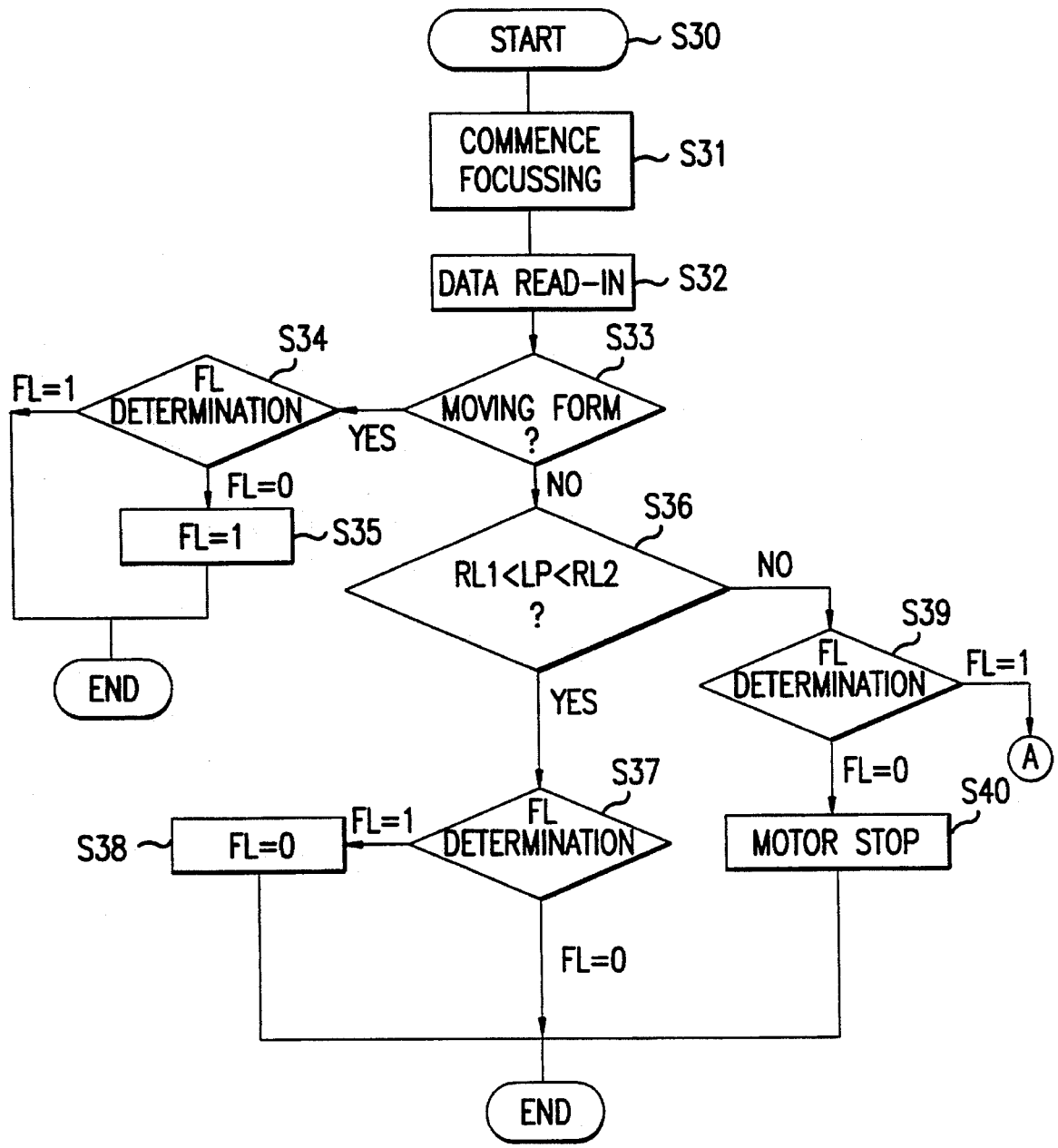
FIG. 6 is a flowchart showing an embodiment of an automatic focus system according to the invention.

FIGS. 6 and 7 are flowcharts showing a second embodiment of an automatic focus system according to the invention. In these figures, the same components shown in FIGS. 1 through 5 are assigned the same reference numbers, thereby abbreviating the need for repeated explanations.

In step S30 in FIG. 6, the program starts when the power source of the camera is turned ON and the release button is depressed halfway. In step S31, the focussing operation is initiated. Here, the focussing operation means driving the photographic lens either toward the close position or toward infinity in order to focus the photographic lens on the subject in the distance measurement area, commencing with a focus determination mechanism not shown in the figure. In step S32, the distance data recorded in the primary memory mechanism 33 and the second memory mechanism 34 are read, with the close distance data from the primary memory mechanism 33 being read as the close distance limit RL1 of the permissible lens drive range and the far distance data from the second memory mechanism 34 being read as the far distance limit RL2 of the permissible lens drive range. In step S33, the determination as to whether the subject is moving is made while the focussing operation is performed.

If a determination is made in step S33 that the subject is moving (YES), the program moves to step S34. If the determination is that the subject is not moving (NO), the program moves to step S36.

In steps S34 and S35, the permissible lens drive range limit release flag (FL) is set or maintained so that FL=1. By placing the flag (FL) in the FL=1 state, the camera continues to pursue the subject which is moving, and even when a photograph is taken outside the temporarily established permissible lens drive range, or when the subject which is being chased stops, during the ensuing focussing drive the focussing drive operation is performed without a problem arising from the fact that the lens position is outside the established permissible lens drive range. When the permissible lens drive range limit release flag (FL) is set so that FL=1 prior to the focussing drive operation, the state of the flag is maintained in step S34. The state of the flag (FL) is maintained as long as it is not altered even after later focussing drive operations, and as long as the lens drive range limit is executed.

When the operations in steps S34 and S35 above are completed, the program is terminated.

In step S36 a determination is made whether the current lens position LP is in the range between the close distance limit RL1 and the far distance limit RL2 of the permissible lens drive range. If the lens position is in the range such that RL1<LP<RL2 (YES), the program moves to step S37. If the lens position is not in the range RL1<LP<RL2 (NO), the program moves to step S39. In this instance, in step S36, it is also possible to use the detected number of occurrences from the frequency detection mechanism 36 to have the program move to step S39 if the number of occurrences is odd because the lens is outside the permissible lens drive range and to have the program move to step S37 if the number of occurrences is even because the lens is within the permissible lens drive range.

In step S37, an evaluation is made with regard to the lens drive permissible range limit release flag (FL). In the event that the lens drive limit release flag (FL) is set so that FL=1 because the camera recognizes that the subject is moving, and the permissible lens drive range has been set in a focussing operation before the current focussing drive operation, the flag is set to FL=0 and is returned to the regular established state of the permissible lens drive range. In other words, if the flag is set so that FL=1 the program proceeds to step S38, and if the flag is set so that FL=0 the program is terminated. In step S38, the permissible lens drive range limit release flag (FL) is set so that FL=0, following which the program is terminated.

Where the program goes to step S39, there are two possibilities, i.e. the case where the lens position (FL=0) is not within the region delineated by RL1<LP<RL2, where it is impossible to capture the subject during focus driving within the region delineated by RL1<LP<RL2, with the indication being that the photographic lens 20 has reached either the RL1 or RL2 position at the close distance or far distance limit of the permissible lens drive range respectively; and the case where the camera continues to pursue the subject outside of the established permissible lens drive range (FL=1) because the subject had been moving during the previous focussing drive and the focussing drive is completed outside the permissible lens drive range.

An evaluation is made of the state of the flag (FL) in step S39, and when the state is FL=0, the program moves to step S40; when the state is FL=1, the program moves to step S41. In step S40, because it was determined in steps S38 and S39 that it is impossible to capture the subject during focus driving within the range delineated by RL1<LP<RL2, with the indication being that the lens had reached either the RL1 or RL2 position at the close distance or far distance limit within of the permissible lens drive range respectively, driving of the lens drive motor is halted and thereafter the program is terminated.

When, in step S39, a determination is made that FL=1, a determination is made in step S41 (FIG. 7) whether it is possible to capture the subject which is being pursued even after the subject has been pursued outside of the permissible lens drive range.

In order to prevent the lens from being forcibly driven to the pursuit initiation position when the subject being pursued stops, regardless of whether this occurs during focussing, and when the subject which is being chased cannot be recognized, the lens is immediately driven to the permissible lens drive range where the subject is thought to be. When the process of capturing the subject continues (YES), the program is terminated. When the subject has been lost from sight (NO), the program proceeds to step S42. In step S42, when the subject being pursued has not stopped moving and has been completely lost from sight, the lens is immediately driven to the permissible lens drive range where the subject is thought to be, and the program prepares for the next focussing drive. As a result, the lens returns to the pursuit initiation position.

The programs shown in the flow charts in FIGS. 6 and 7 are repeatedly executed as long as the power source of the camera (10) is ON and the release button is depressed halfway.

Although an actual embodiment of the invention is used in the above explanation, several other configurations are possible with this technological concept. For instance, the embodiment described above was structured so that the input of drive range information, the recording of drive range information, and the control of lens drive information were performed on the camera body side. However, the application of this invention is not limited to these, and it would also be possible to mount on the lens side any of the other mechanisms, including the information input mechanism 32, the primary memory mechanism 33, the secondary memory mechanism 34 or the control mechanism 15.

As explained above, with an automatic focus system using this invention it is possible to release the control executed by the control mechanism when it is determined by a movement determination mechanism that the subject is moving, allowing the lens to be driven beyond the established photographic lens limiting region, and thereby making it possible to follow a subject which has moved to a greater extent than the photographer had anticipated.

In addition, when a return mechanism is provided, it is possible to return the lens to the position from which the pursuit of the subject commenced when the subject which was being pursued has become lost from view by going outside the established lens position region, thereby making it possible to rapidly prepare for the next photo opportunity.

What is claimed is:

1. A drive mechanism for an automatic focus system which automatically drives the focus adjustment lens, comprising:

a control mechanism to control the drive range of the drive mechanism;

a movement determination mechanism which determines whether a photographic subject is moving; and a control release mechanism which releases control through the control mechanism when it is determined by the movement determination mechanism that the photographic subject is moving.

2. The drive mechanism for the automatic focus system described in claim 1, further comprising:

a lens detection mechanism to detect whether the lens is within the drive range; and a return mechanism which controls the drive mechanism and returns the lens to within the drive range when the lens detection mechanism detects that the lens is outside the drive range.

3. The drive mechanism for the automatic focus system described in claim 2, wherein the return mechanism includes:

a follow-up detection mechanism to detect whether the photographic subject of follow-up focus within the drive range is being captured outside the drive range; and a return prevention mechanism which prevents operation of the return mechanism when the follow-up detection mechanism detects that the subject is being captured.

4. The drive mechanism for the automatic focus system described in claim 2, wherein the position which forces the return is the follow-up initiation position when the focus follow-up of the subject is initiated.

5. The drive mechanism for the automatic focus system described in claim 2, wherein the lens detection system includes:

a frequency detection system to detect the number of times that the control positions which set the drive range fall outside the same control range; and a determination mechanism which determines that the lens is outside the drive range if the number of occurrences is odd and which determines the lens to be within the drive range if the number of occurrences is even.

6. The drive mechanism for the automatic focus system described in claim 1, wherein the control release mechanism includes a release signal generation mechanism which generates a release signal which commands the release, the control release mechanism continuing in the release mode while the release signal is being generated.

7. A drive mechanism for an automatic focus system of a camera, comprising:

a focusing lens;

lens driving means for moving said focusing lens;

range setting means for setting a focusing range;

movement detection means for detecting movement of a photographic subject;

control means for controlling operations of the drive mechanism; and release means for overriding range limits defining the focusing range when the photographic subject is moving.

8. The drive mechanism as claimed in claim 7, wherein said range setting means includes:

first setting means for setting a near focusing range limit; and second setting means for setting a far focusing range limit.

9. The drive mechanism described in claim 8, wherein said range setting means further includes:

first memory means for storing the near focusing range limit; and second memory means for storing the far focusing range limit.

10. The drive mechanism described in claim 7, wherein said range setting means comprises:

focusing means for moving said focusing lens;

first setting means for setting a near focusing limit by taking a position setting of said focusing lens after movement to a near position using said focusing means; and second setting means for setting a far focusing limit by taking the position setting of said focusing lens after movement to a far position using said focusing means.

11. The drive mechanism described in claim 10, further comprising monitoring means for detecting an amount of movement of said focusing lens.

12. The drive mechanism described in claim 11, further comprising focus detection means for detecting when the photographic subject is in focus.

13. The drive mechanism described in claim 12, wherein said movement detection means uses outputs from said monitoring means and said focus detection means to determine whether the photographic subject is moving.

14. The drive mechanism described in claim 7, further comprising frequency detection means for detecting a number of times one of the range limits is overridden and crossed.

15. The drive mechanism described in claim 14, wherein said frequency detection means further comprises determination means for determining whether said focusing lens is outside the focusing range.

16. The drive mechanism described in claim 15, wherein said determination means determines said focusing lens is outside the focusing range when the number of times one of the range limits is crossed is odd and determines said focusing lens is inside the focusing range when the number of times is even.

17. A method of focusing an automatic focus camera, comprising the steps of:

establishing a focusing range defined by upper range limit and a lower range limit;

determining the movement state of a photographic subject;

determining whether the photographic subject is within the focusing range; and permitting an override of the focusing range when the photographic subject is moving.

18. The method described in claim 17, further comprising the step of setting an override flag when the photographic subject is moving.

19. The method described in claim 18, wherein when it is determined the photographic subject is not moving and is located within the focusing range, further comprising the step of setting an override flag in a non-override state.

20. The method described in claim 17, further comprising the step of moving a focusing lens to establish a camera focus.

21. The method described in claim 20, further comprising the step of stopping movement of the focusing lens at an appropriate one of upper and lower range limits of the focusing range when the photographic subject is not moving and is outside the focusing range.

22. The method described in claim 17, further comprising the step of counting the number of times the focusing lens crosses a one of the upper and lower range limits when following movement of the photographic subject.

23. The method described in claim 22, further comprising a step of determining the focusing lens is outside the focusing range if the count of the number of times is odd and within the focusing range if the count of the number of times is even.

24. The method described in claim 18, further comprising a step of following movement of the photographic subject outside of the focusing range when the override flag is set.

25. The method described in claim 24, further comprising a step of attempting to capture the photographic subject outside the focusing range.

26. The method described in claim 24, further comprising the step of returning the focusing lens to the focusing range when the photographic subject is lost.

\* \* \* \* \*